US012671597B2

(12) United States Patent (10) Patent No.: US 12,671,597 B2
Kaufmann (45) Date of Patent: Jun. 30, 2026

(54) SECURE IDENTITY CARD USING UNCLONABLE FUNCTIONS

(71) Applicant: ASSA ABLOY AB, Stockholm (SE)

(72) Inventor: Martin Kaufmann, Graz (AT)

(73) Assignee: ASSA ABLOY AB, Stockholm (SE)

( * ) Notice: Subject to any disclaimer, the term of this patent is extended or adjusted under 35 U.S.C. 154(b) by 627 days.

(21) Appl. No.: 17/634,536

(22) PCT Filed: Aug. 14, 2020

(86) PCT No.: PCT/EP2020/072877

§ 371 (c)(1),
(2) Date: Feb. 10, 2022

(87) PCT Pub. No.: WO2021/028574

PCT Pub. Date: Feb. 18, 2021

(65) Prior Publication Data

US 2022/0337435 A1 Oct. 20, 2022

Related U.S. Application Data

(60) Provisional application No. 62/886,686, filed on Aug. 14, 2019.

(51) Int. Cl.
*H04L 9/32* (2006.01)
(52) U.S. Cl.
CPC .................................. *H04L 9/3278* (2013.01)
(58) Field of Classification Search
CPC ... H04L 9/3278; H04L 9/0643; H04L 9/0866; H04L 9/0869; G06F 21/44
See application file for complete search history.

(56) References Cited

U.S. PATENT DOCUMENTS 8,762,723 B2 * 6/2014 Yu ......................... H04L 9/0844
713/169
10,256,983 B1 * 4/2019 Bauer ................... H04L 9/0861
(Continued)

FOREIGN PATENT DOCUMENTS

CN 1610441 5/2010
CN 103778374 5/2014
(Continued)

OTHER PUBLICATIONS

"International Application Serial No. PCT/EP2020/072877, International Search Report mailed Nov. 6, 2020", 5 pgs.
(Continued)

*Primary Examiner* — Gary S Gracia
(74) *Attorney, Agent, or Firm* — Schwegman Lundberg & Woessner, P.A.

(57) ABSTRACT

Various systems and methods for securely sharing private information are described herein. A user device includes a memory device; and a processor subsystem, which when configured by instructions stored on the memory device, is operable to perform the operations comprising: receiving, at a verifier device, an indication of supported unclonable functions and a challenge value; identifying an unclonable function from the supported unclonable functions, to obtain a selected unclonable function; executing the selected unclonable function based on the challenge value, to obtain a result; and transmitting the indication of supported unclonable functions, the selected unclonable function, and the result to the verifier device to authenticate the user device.

20 Claims, 7 Drawing Sheets

(56) References Cited

U.S. PATENT DOCUMENTS

| | | | | |
|---|---|---|---|---|
| 10,320,573 | B2 * | 6/2019 | Cambou | H04L 9/3278 |
| 11,152,313 | B1 * | 10/2021 | Wong | H10D 84/05 |
| 11,700,246 | B2 * | 7/2023 | Tremlet | G06Q 20/3227 |
| | | | | 705/50 |
| 2005/0097363 | A1 * | 5/2005 | Bajko | H04L 65/1073 |
| | | | | 726/4 |
| 2005/0198490 | A1 * | 9/2005 | Jaganathan | H04L 63/205 |
| | | | | 713/151 |
| 2010/0293612 | A1 * | 11/2010 | Potkonjak | H04L 9/3278 |
| | | | | 726/20 |
| 2012/0131340 | A1 * | 5/2012 | Teuwen | H04L 9/3273 |
| | | | | 713/168 |
| 2014/0189890 | A1 * | 7/2014 | Koeberl | G09C 1/00 |
| | | | | 726/34 |
| 2015/0195088 | A1 * | 7/2015 | Rostami | H04L 9/3278 |
| | | | | 380/28 |
| 2017/0005811 | A1 * | 1/2017 | Tremlet | H04L 9/3278 |
| 2017/0141930 | A1 * | 5/2017 | Rajski | G06F 21/75 |
| 2017/0255503 | A1 * | 9/2017 | Hori | H04L 9/32 |
| 2018/0129801 | A1 | 5/2018 | Cambou | |
| 2018/0183613 | A1 * | 6/2018 | Dafali | H04L 9/3278 |
| 2019/0165957 | A1 * | 5/2019 | Abbott | G06F 21/44 |
| 2019/0165958 | A1 * | 5/2019 | Guajardo Merchan | |
| | | | | H04L 9/3278 |
| 2019/0199525 | A1 | 6/2019 | Mondello et al. | |
| 2019/0305973 | A1 * | 10/2019 | Dewan | H04L 9/14 |
| 2020/0186350 | A1 * | 6/2020 | Wentz | H04L 9/3247 |
| 2021/0091952 | A1 * | 3/2021 | Wentz | H04L 9/0866 |
| 2021/0099314 | A1 * | 4/2021 | Schat | H04L 9/002 |
| 2021/0234710 | A1 * | 7/2021 | Facon | H04L 9/3278 |
| 2022/0116233 | A1 * | 4/2022 | Hoffman | H04L 9/3278 |
| 2022/0166638 | A1 * | 5/2022 | Razi | H04L 9/3278 |
| 2022/0318437 | A1 * | 10/2022 | Pomerance | H04L 9/001 |
| 2022/0337435 | A1 * | 10/2022 | Kaufmann | H04L 9/3278 |

FOREIGN PATENT DOCUMENTS

| | | |
|---|---|---|
| CN | 107133533 | 9/2017 |
| CN | 108173662 | 6/2018 |
| CN | 108768660 | 11/2018 |
| CN | 109522753 | 3/2019 |
| CN | 110100412 | 8/2019 |
| CN | 114365134 | 4/2022 |
| EP | 4040720 | 2/2024 |
| WO | 2017040124 | 3/2017 |
| WO | WO-2018183915 A1 | 10/2018 |
| WO | WO-2018183926 A1 | 10/2018 |
| WO | 2020109512 | 6/2020 |
| WO | WO-2021028574 A1 | 2/2021 |

OTHER PUBLICATIONS

"International Application Serial No. PCT/EP2020/072877, Written Opinion mailed Nov. 6, 2020", 6 pgs.

"International Application Serial No. PCT/EP2020/072877, International Preliminary Report on Patentability mailed Feb. 24, 2022", 8 pgs.

"European Application Serial No. 20757318.9, Response Filed Jun. 13, 2022 to Communication Pursuant to Rules 161 and 162 mailed May 18, 2022", 16 pgs.

"European Application Serial No. 22165419.7, Extended European Search Report mailed Jul. 11, 2022", 5 pgs.

"European Application Serial No. 22165419.7, Response Filed Jan. 12, 2023 to Extended European Search Report mailed Jul. 11, 2022", 4 pages.

"Chinese Application Serial No. 202080060625.0, Office Action mailed Apr. 30, 2024", with English translation, 24 pages.

"Chinese Application Serial No. 202080060625.0, Response filed Oct. 12, 2024 to Office Action mailed Apr. 30, 2024", with English claims, 19 pages.

Liu, Ya-Nan, "PUF based Lightweight Device Authentication and Its Implementation", Journal of Jinling Institute of Technology, No. 3 with machine English translation, (Sep. 30, 2018), 14 pages.

Xu, Rui, "Identification System for Enterprise Users Based on National Cryptographic Algorithms and PUF", Computer and Modernization, No. 03 with machine English translation, (Mar. 15, 2018), 17 pages.

Yuan, Bian-Qing, "Analysis and Design of RFID Security Protocol", Scientific and Technical Documentation Press with machine English translation, (Sep. 30, 2018), 6 pages.

Zhu, Feng, "A Lightweight RFID Mutual Authentication Protocol with PUF", Sensors, vol. 19, No. 13, (Jul. 1, 2017), 22 pages.

"Chinese Application Serial No. 202080060625.0, Office Action mailed Nov. 12, 2024", with English translation, 21 pages.

"Annual Report of China Academy of Engineering Physics Edition 2016", Annual Report of China Academy of Engineering Physics Editorial Department, China Atomic Energy Press with manual English translation, (Dec. 2016), 12 pages.

"Chinese Application Serial No. 202080060625.0, Response Filed Jan. 13, 2025 to Office Action mailed Nov. 12, 2024", with English claims, 18 pages.

"Chinese Application Serial No. 202080060625.0, Decision of Rejection mailed Feb. 26, 2025", W/English Translation, 18 pgs.

"Chinese Application Serial No. 202080060625.0, Response Filed May 26, 2025 to Decision of Rejection mailed Feb. 26, 2025", W/ English Claims, 19 pgs.

* cited by examiner

*400*

*402*

STORE SOFTWARE-BASED UNCLONABLE FUNCTIONS

*404*

VERIFIER SELECTS CHALLENGE AND SEND

*406*

SELECT UNCLONABLE FUNCTION

*408*

EXECUTE UNCLONABLE FUNCTION WITH CHALLENGE AND RESPOND

*410*

VERIFY OUTPUT OF UNCLONABLE FUNCTION

_500_

_502_

RECEIVE INDICATION OF SUPPORTED UNCLONABLE
FUNCTIONS AND CHALLENGE VALUE

_504_

SELECT AN UNCLONABLE FUNCTION FROM THE
LIST OF SUPPORTED UNCLONABLE FUNCTIONS

_506_

EXECUTE THE SELECTED UNCLONABLE FUNCTION
USING THE CHALLENGE VALUE

_508_

TRANSMIT RESULT

*600*

*602*

TRANSMIT SUPPORTED UNCLONABLE FUNCTIONS AND A CHALLENGE VALUE

*604*

RECEIVE RESPONSE WITH SELECTED UNCLONABLE FUNCTION AND RESULT

*606*

OBTAIN EXPECTED RESULT BASED ON SELECTED UNCLONABLE FUNCTION AND CHALLENGE VALUE

*608*

COMPARE EXPECTED RESULT WITH RESULT FROM RESPONSE

SECURE IDENTITY CARD USING UNCLONABLE FUNCTIONS

CROSS-REFERENCE TO RELATED APPLICATION(S)

This application is a national stage application under 35 U.S.C. § 371 of PCT Appl. No. PCT/EP2020/072877, titled "Secure Identity Card Using Unclonable Functions," filed Aug. 14, 2020, which claims priority to U.S. Prov. Pat. Appl. No. 62/886,686, titled "Secure Identity Card Using Unclonable Functions," filed Aug. 14, 2019, each of which is hereby incorporated by reference herein in its entirety.

TECHNICAL FIELD

Embodiments described herein generally relate to electronic credential systems, and in particular, to secure authentication.

BACKGROUND

Identity documents, such as identity cards, may have multiple pieces of information stored on them. When in use, an identity card is read by a reader device or interrogator device. The pieces of information stored on the identity card are protected using various security mechanisms to limit access by reader devices.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
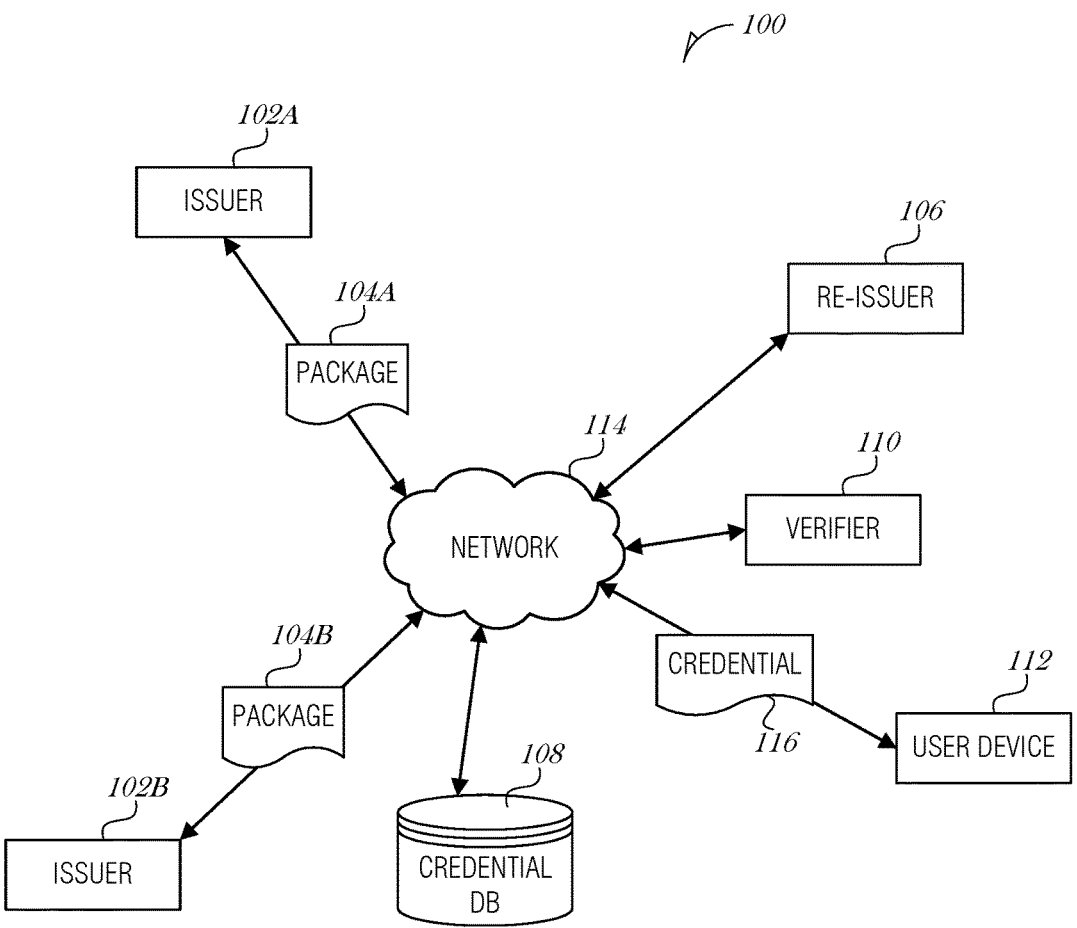
FIG. 1 is a block diagram illustrating a credential system, according an embodiment.

In the following description, for purposes of explanation, numerous specific details are set forth in order to provide a thorough understanding of some example embodiments. It will be evident, however, to one skilled in the art that the present disclosure may be practiced without these specific details.

Personal electronic identity cards are becoming more popular. Such cards may be issued by governments, schools, health care systems, or the like. To use a personal electronic identity card, a card reader (e.g., reader device or interrogator device) is used to read some or all of the information contained on the card. There are various protocols in place that dictate how a reader device is to access data on the identity card.

A security risk exists where a malicious party may clone a personal identity card and then use the card to access places or resources by impersonating the owner of the card. The present disclosure introduces the use of an unclonable function in the security protocol used to access data on an identity card. Unclonable functions may be separated into two classifications: software-based and hardware-based. Software-based unclonable functions include functions that use one-way abstract mathematical functions, such as prime number factorization, discrete logarithm problems, and hashing. Hardware-based unclonable functions use inherent randomness of the physical structure or manufacture of underlying hardware to create a unique signature. Hardware-based unclonable functions are also referred to as physically unclonable functions (PUF).

A number of various types of PUFs exist. These include optical PUFs, coating PUFs, delay PUFs, static random-access memory (SRAM) PUFs, radio frequency (RF) PUFs, butterfly PUFs, bistable ring PUFs, digital PUFs, magnetic PUFs, metal resistant PUFs, and the like. Using natural variation in manufacturing and materials, each PUF is nearly guaranteed to be a unique representation. For instance, a digital PUF is based on the interconnect geometrical randomness induced by lithography variations during manufacture, while an optical PUF is based on the random application of light scattering particles applied to a surface, which when illuminated cast a unique and reproducible speckle pattern. A PUF is based on the physical system and is a repeatable and straightforward way to evaluate using the physical system.

Using an unclonable function provides increased security because its output looks like a random function, which is unpredictable even for an attacker with physical access. Unclonability refers to a function or system where the cost to engineer or manufacture another function or system with the same fingerprint would be prohibitively expensive or impractical using known techniques.

The present disclosure describes an improved communication mechanism to provide stronger security of the data elements on the identity card with the use of unclonable functions. Additional features are discussed below.

System Overview

Identity credentials (e.g., electronic documents, cards, mobile profiles, etc.) include information such as a first and last name, a date of birth, an address, etc. In the digital world, each piece of information is a data element and these data elements are combined into a package that is issued to a target user. Having a digital credential provides several advantages. Information and documentation are easy to access. The information is centralized and may be stored in a network location, providing backup and redundancy. Digital credentials may also be more immune to counterfeiting and corruption than conventional credentials.

Some terms are provided here for common reference. It is understood that these terms are non-limiting and that other terms, phrases, or descriptions of operations, components, or devices in the systems and methods described may be used.

Package—a Package is a collection of name:value pairs of data. The name of the data pair may be referred to as a Tag, Field, or Description. A Package may include metadata about the Package, such as a Package Hash, Package Signature, Package Expiration, or the like.

Credential—a Credential is an encapsulation of one or more packages. An aggregated Credential includes two or more packages. A Credential may include metadata describing the issuer of the credential, expiration or validity dates, or other information about the Credential.

Issuer—an Issuer is a person, entity, service, or other platform that provides a Package. The Issuer may attest to the authenticity, validity, and correctness of data contained in the Package. The Issuer may sign the Package or sign individual data in the Package. The Issuer may be an Original Issuer, which is an Issuer that created the data, or a Re-Issuer, which is one that reuses the Original Issuer's data. An Issuer or Re-issuer may issue a Package as a Credential.

Data that is provided by an Issuer may have an associated Assurance Level. An Assurance Level is an indication of the trustworthiness of the data. The Assurance Level may be a numerical range, a letter grade, or other indication. Data issued by an Original Issuer may have the highest Assurance Level. As data is reused and republished by Re-Issuers in derivative Packages, the Assurance Level may decrease stepwise. By analyzing the Assurance Level of data contained in a Package, one may be able to see how many steps away the data in the current Package is from the Original Issuer.

Verifier—a Verifier is a device, person, entity, service, or other platform that verifies data in a Package or Credential. A Verifier may obtain data from a user Credential, for example a point-of-sale, and then contact one or more Issuers to validate the data. Other forms of validation may be used, such as by analyzing data signatures, analyzing a blockchain, or the like. A Verifier may verify the authenticity or validity of a Credential.

FIG. 1 is a block diagram illustrating a credential system 100, according an embodiment. The credential system 100 includes a first original issuer 102A and a second original issuer 102B (collectively referred to as 102) that issue core packages 104A, 104B (collectively referred to as 104). The core packages 104 include tags and values that are generated by the original issuers 102. The credential system 100 also includes re-issuer 106 that compiles data from one or more issuers (or re-issuers) in the credential system 100 and re-issues an aggregated credential with contents from two or more packages. While one re-issuer 106 is illustrated, it is understood that more than one re-issuer 106 may be active in the credential system 100.

The re-issuer 106 may also add its own data to the aggregate credential by issuing its own package and consolidating the package with data from packages of other issuers 102. The re-issuer 106 may sign its own package, portions of its own package, or the aggregated credential.

In the example illustrated in FIG. 1, the first original issuer 102A is a government agency that issues birth certificates (e.g., a Public Health Office of a county). The first original issuer 102A is the place where the user's name, date of birth (DOB), and place of birth are first recorded. The second original issuer 102B is a vehicle manufacturer that produces vehicles. Each vehicle produced is uniquely identified with a vehicle identification number (VIN). The second original issuer 102B creates a package with data describing a vehicle.

The re-issuer 106 may be a government agency that produces packages for vehicle titles (e.g., a Department of Motor Vehicles (DMV)). The vehicle title is identified with a title identifier that uniquely identifies the title. Consequently, the aggregate credential produced by the re-issuer 106 may include: the vehicle title identifier, as issued by the re-issuer 106; some or all of information from a package from first original issuer 102A describing an owner's personal information; and some or all of information from a package from the second original issuer 102B describing the vehicle.

A credential database 108 may be used to store packages and other data from one or more issuers 102 or re-issuers 106. The credential database 108 may use a relational database management system (RDBMS) to organize the package information into tables. The credential database 108 may be queried by various entities or users, such as a re-issuer 106, a verifier 110, or a user at a user device 112. A re-issuer 106 may query the credential database 108 to obtain original package information to populate an aggregated credential. The credential database 108 may be implemented on one or more servers, which may be owned or operated by a credential issuing entity. In some embodiments, credential issuing entities access the credential database 108 as part of a service.

The various components of the credential system 100 may communicate over one or more networks 114, which may include any known type of network that facilitates machine-to-machine communications. The network 114 may use the same communication protocols or different protocols without departing from the scope of the present disclosure. The network 114 may include wired or wireless communication technologies. The Internet is an example of a communication network that constitutes an Internet Protocol (IP) network consisting of many computers, computing networks, and other communication devices located all over the world, which are connected through many telephone systems and other means. Other examples of a communication networks include, without limitation, a Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 114 need not be limited to any one network type, and instead may be comprised of several different networks or network types. Moreover, the network 114 may include a number of different communication media such as coaxial cable, copper cable/wire, fiber-optic cable, antennas for transmitting/receiving wireless messages, and combinations thereof.

The user device 112 and verifier device 110 may be of any type of compute device. The user device 112 is typically portable in nature, and may take the form of a cellular phone, mobile device, smart phone, personal digital assistant, laptop, tablet, wearable device, portable credential card, key fob, or the like. It should be appreciated that the verifier device 110 does not necessarily have to take the form of a mobile device, but rather may be implemented as a part of a personal computer, desktop computer, kiosk, payment terminal, beacon, or the like.

During a transaction, a user with the user device 112 may be asked to present a credential 116 or part of a credential 116 to a verifier device 110. The verifier device 110 may be a point-of-sale terminal with a beacon, for example. The beacon may periodically attempt to connect with user devices 112 in communication range or within some threshold proximity. The verifier device 110 may connect with the user device 112 over wireless communications (e.g., BLU-ETOOTH® or WI-FI), and obtain some or all of a credential 116 from the user device 112. For instance, as the user approaches the checkout lane, the beacon may advertise a connection, which the user device 112 uses to connect with the beacon and construct a secure connection. The beacon may request certain credential information, such as a user's name and credit card number, and the user device 112 may respond with the information. The user may selectively share portions of the credential 116 to the verifier device 110 to maintain as much personal privacy as possible. The verifier device 110 may validate the credential 116 by accessing an issuer 102, re-issuer 106, or credential database 108.

Depending on how the system is organized, the user device 112 may obtain one or more credentials 116 from one or more issuers 102 or re-issuers 106. For instance, the user may obtain a driving license credential from a government motor vehicles agency and a health care identification card from a health insurance company. Alternatively, the user may obtain a composite credential that includes a package from the government motor vehicles agency and another package from the health insurance agency.

The interaction between the user device 112 and the verifier device 110 may be controlled by a protocol and command set that is used to access data on the user device 112 from the verifier device 110. In an embodiment, the protocol and command set are SEOS® CORE from HID GLOBAL CORPORATION.

The Seos® core is a software implementation, in the form of an application or firmware executing on a device, that manages and secures a set of data containers accessible through the Seos® command set. Each data container is known as an Application Data File (ADF). Each ADF is uniquely identified within the container by an OID (Object Identifier). OIDs are globally unique. An application that is accessing the container will use the OID to select the ADF that it wishes to read/write to. An ADF is itself comprised of multiple objects.

There is a sequence of commands that are used to read and write data to an established ADF. Regardless of whether the application is reading or writing data it must first select the ADF it wishes to address and then establish a secure channel with that ADF. Once this has been done it can then either write to the ADF using the PUT DATA command or read from the ADF using the GET DATA command.

To first access the ADF, a SELECT ADF command is used to select the ADF that the application wishes to read from/write to. It requires possession of the privacy key set for that ADF. This key set is defined within the ADF. Privacy keys are not diversified.

The GENERAL AUTHENTICATE command establishes a secure channel with a specific ADF within the Seos® core. It requires possession of an authentication key set for that ADF. These key sets are defined within the ADF. Authentication keys are diversified and hence unique to each instance of a Seos® core. Note that a single ADF may have multiple authentication key sets. Access control rules can be defined within the ADF that determine which authentication key set must be used to gain read or write access to a specific object within that ADF.

The next command is PUT DATA. This command enables the application to write data to an identified object within the ADF. It requires possession of the of the session key established during GENERAL AUTHENTICATE. Another command is GET DATA. This command enables the application to read data from an identified object within the ADF. There are also commands to create and destroy ADFs within the Seos® core.

Figure 2:
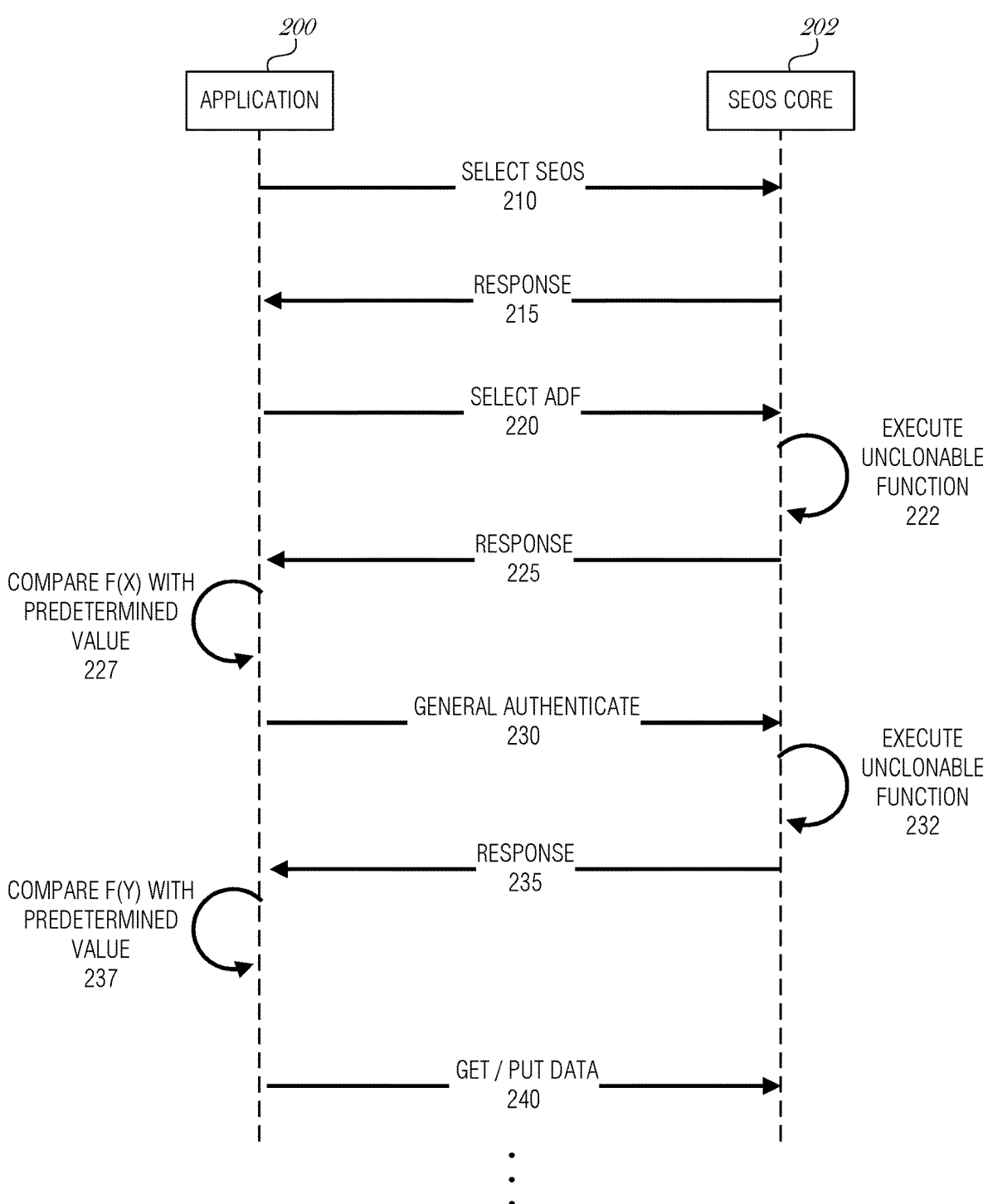
FIG. 2 is a message sequence diagram illustrating an interaction between an application executing on a verifier device and Seos® on a user device, according to an embodiment.

FIG. 2 is a message sequence diagram illustrating an interaction between an application 200 executing on a verifier device (e.g., verifier device 110) and a Seos® core 202 on a user device (e.g., user device 112), according to an embodiment. The application 200 issues a SELECT SEOS command (210) to select the Seos® core. This is optional in a native Seos® card because the Seos® core is the default application. The Seos® core 202 responds with a file control information (215).

The application 200 then issues a SELECT ADF command (220) using the ADF's OID. Multiple ADF OIDs may be specified in the SELECT ADF command (220). In order to strengthen security, the SELECT ADF command (220) includes a list of supported unclonable functions ($F_{sup}$) and a challenge value x. The challenge value may be a random value (e.g., a machine-generated pseudo-random value). The challenge value may be bounded to a certain length, such as 4 bits, 8 bits, 2 bytes, or other size depending on the implementation. The list $F_{sup}$ and challenge value are included in the data portion of the SELECT ADF message.

In response to the SELECT ADF command (220), the Seos® core provides an encrypted message (225) with data for use in key derivation during the later stages when the application 200 accesses the contents of the ADF. Additionally, the response to the SELECT ADF command (225) includes the list of supported unclonable functions ($F_{sup}$), an identifier of the unclonable function used ($F_{used}$), and an output of the unclonable function (f(x)) that was used. The list of supported unclonable functions ($F_{sup}$) is provided as a way for the application 200 to verify that the response is valid and that the Seos® core 202 is authentic. For instance, the application 200 may compare the value of $F_{sup}$ that was sent in the SELECT ADF command (220) with the value of $F_{sup}$ in the response (225) to verify a valid response.

If the Seos® core 202 does not support any of the functions in the $F_{sup}$ list, then the return value f(x) is equal to the challenge value x. If the Seos® core 202 supports at least one function in the $F_{sup}$ list, then the Seos® core 202 may execute an unclonable function (operation 222) and return the result, along with an indication of which function was executed (225). The output of the unclonable function f(x) is compared to a previously determined value to validate the device (operation 227).

The $F_{sup}$ list may include software-based or hardware-based unclonable functions. For a software-based unclonable function, the challenge value may be used as input to the function and f(x) is the output. For a hardware-based unclonable function (e.g., PUF), the challenge value may be a parameter used to configure hardware.

A user device may support a combination of hardware and software unclonable functions. For instance, a user device may implement several hardware PUFs, such as a SRAM PUF, a digital PUF, and a butterfly PUF. Each PUF may use a certain hardware component, such as SRAM, a pair of pre-designated flip-flops, a pre-designated circuit, or the like. The challenge value may be used to control a type of input, a timing of an input, a magnitude of an input, or other aspects to trigger the PUF functionality in a circuit, component, or aspect of the user device.

After the ADF is selected by the SELECT ADF command (220), the authentication phase is used to authenticate the application 200 to the ADF. A GENERAL AUTHENTICATE command (230) is issued to the Seos® core 202. The response (235) to the GENERAL AUTHENTICATE command (230) includes data from the Seos® core 202 that is used for mutual authentication. In the mutual authentication, the application 200 authenticates to the Seos® core 202 and the Seos® core 202 to the application 200. As part of the mutual authentication operation, the application 200 sends an $F_{sup}$ list and a challenge value y in the GENERAL AUTHENTICATE command (230). The $F_{sup}$ list used in the authentication operation may differ from the $F_{sup}$ list used above in the SELECT ADF (220) communication or it may be the same list. In the response (235), the Seos® core 202 includes $F_{sup}$, $F_{used}$, and f(y), which is the output of the used unclonable function withy as the input (operation 232). The output of the unclonable function f(y) is compared to a previously determined value to validate the device (operation 237).

The application 200 may use the return value f(x) or f(y) to determine whether the Seos® core 202 is authentic and that the message is valid. The return value is compared to a previously-known resultant value that is mapped to the input challenge value (e.g., x or y, respectively) (operations 227 or 237, respectively). The previously-known resultant value may be stored in a secure memory device and may be provided to the application 200 using a secure communication mechanism. The previously-known resultant value may be stored remotely from the application 200 (e.g., in a cloud service) and be obtained using a secure communication channel. In some cases, a range of input values are used to obtain a range of output values and each of the input values and corresponding output values are stored in the secure memory device for later reference. The input and output values may be stored with a corresponding device identifier or Seos® core 202 identifier, to uniquely identify the input/output pairs corresponding to the device.

After the application 200 and Seos® core 202 mutually authenticate, additional operations may be performed (240), such as a GET DATA or PUT DATA operation to retrieve or insert data into/out of an ADF.

Although Seos® is described here in various use cases, it is understood that the implementation of PUF-enabled security mechanisms is not limited to Seos® installations. The following sections include descriptions of process flows that are able to be implemented in any secured resource facility. Generally, a PUF is designated and provided to a user device, which executes the PUF and returns the result. The result is verified against a previously-stored value to validate the user device. Additional embodiments and features are described throughout this document.

Figure 3:
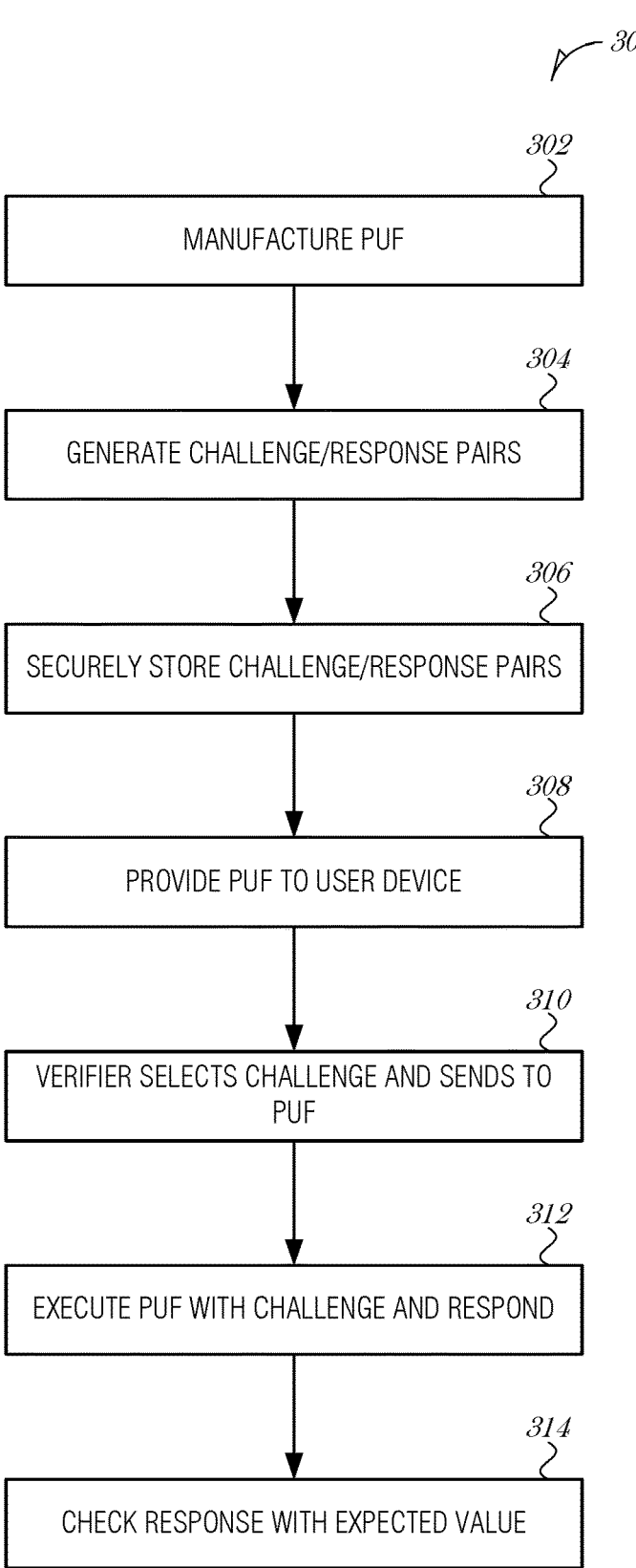
FIG. 3 is a flowchart of a method for using a physically unclonable function (PUF), according to an embodiment.

FIG. 3 is a flowchart of a method 300 for using a physically unclonable function (PUF), according to an embodiment. The PUF is manufactured (operation 302). Challenge and response pairs are generated from unclonable function(s) (operation 304). These challenge and response pairs may be for multiple types of supported unclonable functions. The challenge and response pairs are stored in a secure storage (operation 306). The secure storage is accessible to the verifier device. The PUF (e.g., user device, identity card, etc.) is provided to the user device (operation 308). When the user is ready to present the user device for authentication, the verifier device selects a challenge from the known challenge/response pairs and transmits it to the user device (operation 310). The user device runs the challenge on the PUF and returns the response (operation 312). The verifier device is then able to check and ensure that the response is correct based on the challenge/response pairs saved in secure storage (operation 314). If there are several PUFs supported by the user device, then the user device may select one and use the challenge with the specific one and then provide an indication to the verifier device of which PUF was used.

Figure 4:
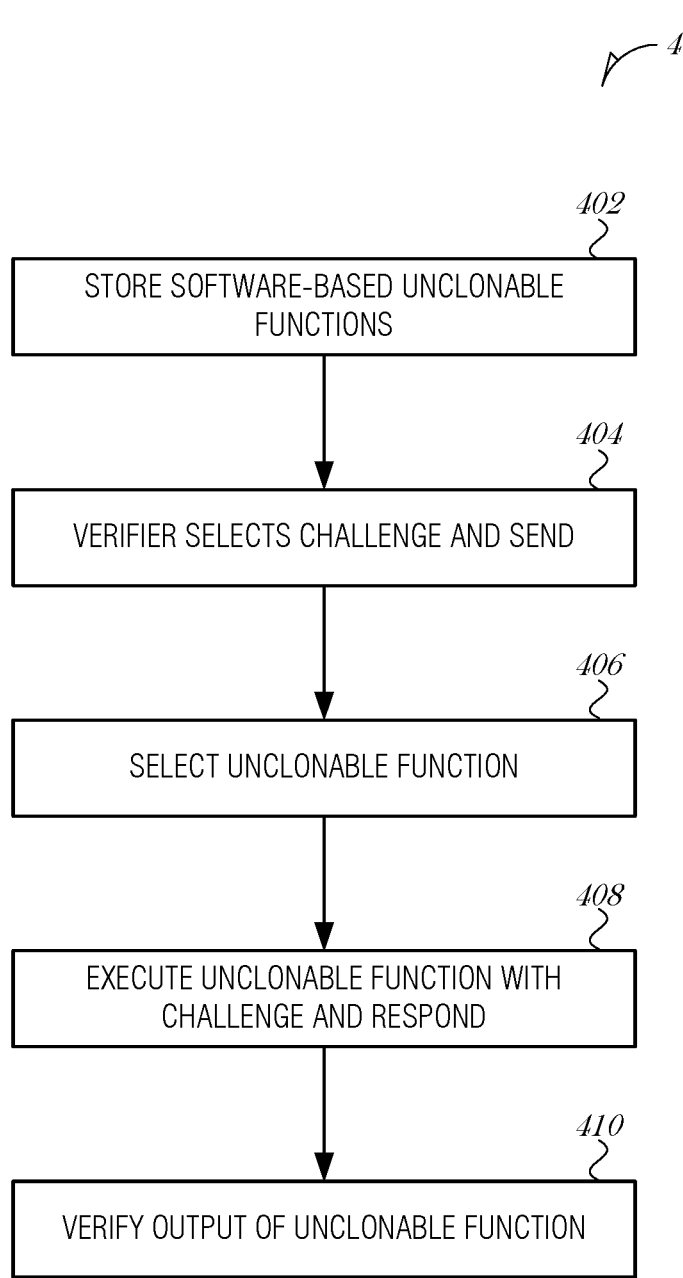
FIG. 4 is a flowchart of a method for using a software-based unclonable function, according to an embodiment.

FIG. 4 is a flowchart of a method 400 for using a software-based unclonable function, according to an embodiment. Software-based unclonable functions are identified and stored in secure storage (402). Each of the verifier device and the user device have access to the unclonable functions. When the user is ready to present the user device for authentication, the verifier device selects a challenge and transmits it to the user device (operation 404). The challenge may be a random value. The user device selects an unclonable function to execute (operation 406). It may be selected from a list of unclonable functions supported by the verifier device. The user device runs the challenge with the selected unclonable function and returns the response (operation 408). The user device also includes an indication of which unclonable function was used in the execution. The verifier device is then able to check and ensure that the response is correct by executing the same unclonable function with the initial challenge and comparing the result with that provided by the user device (operation 410).

Operations

Figure 5:
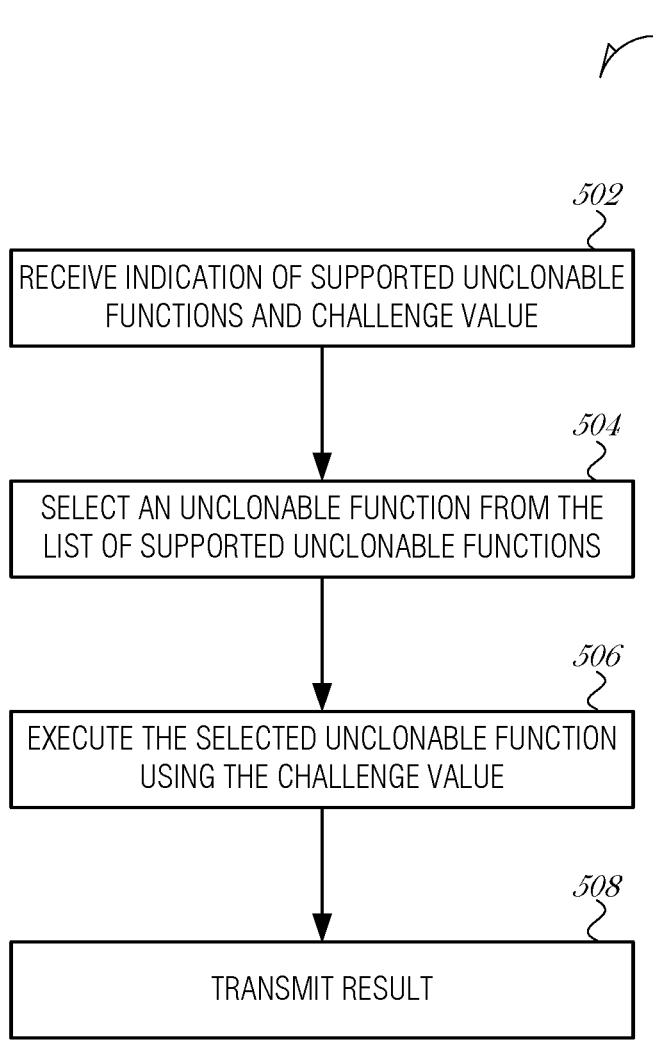
FIG. 5 is a flowchart illustrating a method of using unclonable functions in an authentication mechanism, according to an embodiment.

FIG. 5 is a flowchart illustrating a method 500 of using unclonable functions in an authentication mechanism, according to an embodiment. The method 500 begins at operation 502, where an indication of supported unclonable functions and a challenge value are received at a user device from a verifier device. In an embodiment, the indication of supported unclonable functions is included in a field of a message structure. In an embodiment, the challenge value is a random value.

At 504, an unclonable function is identified from the supported unclonable functions. This obtains a selected unclonable function.

At 506, the selected unclonable function is executed based on the challenge value, to obtain a result. In an embodiment, the selected unclonable function is a physically unclonable function (PUF). In a further embodiment, executing the unclonable function based on the challenge value includes executing the PUF with the challenge value as an input bit value for the PUF.

In an embodiment, the selected unclonable function is a software-based unclonable function. In a further embodiment, executing the unclonable function based on the challenge value includes executing the software-based unclonable function with the challenge value as an input value to the software-based unclonable function.

At 508, the indication of supported unclonable functions, the selected unclonable function, and the result are transmitted to the verifier device to authenticate the user device.

In an embodiment, the credential is stored in a memory device of the user device. In a further embodiment, the unclonable function is used to secure the credential. In a further embodiment, the method 500 includes receiving a message from the verifier device to access the credential, the message including the indication of supported unclonable functions and the challenge value, and the message having a corresponding response message format defined by a protocol. The method 500 includes transmitting the indication of supported unclonable functions, the selected unclonable function, and the result to the verifier device to authenticate the user device using the corresponding response message format. The message formats may be in a Seos® command protocol, e.g., SELECT ADF or GENERAL AUTHENTICATE.

Figure 6:
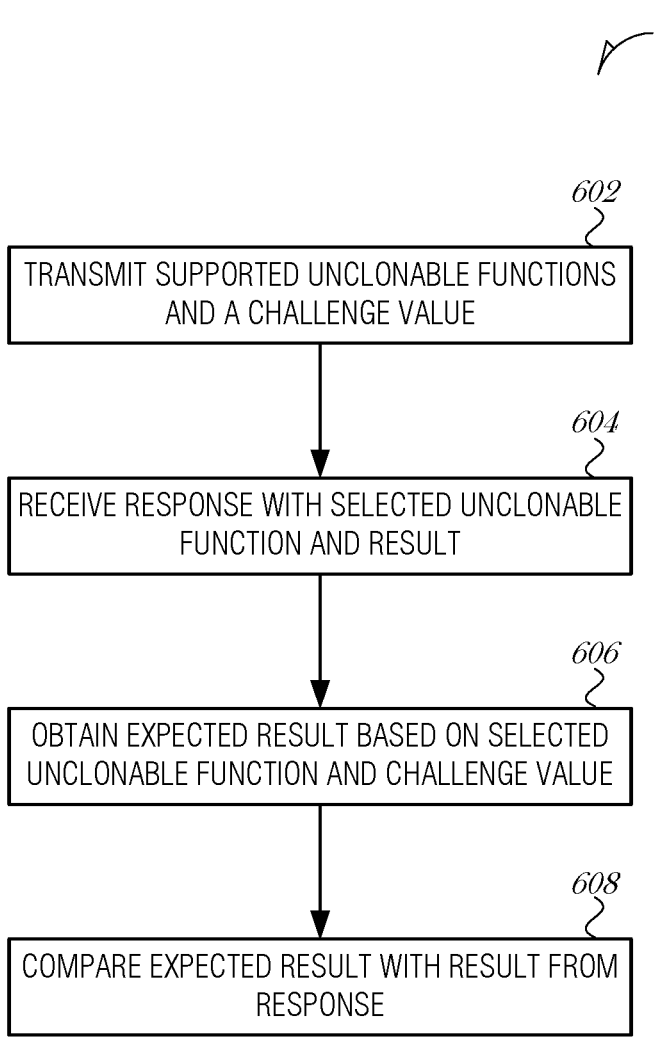
FIG. 6 is a flowchart illustrating a method of using unclonable functions in an authentication mechanism, according to an embodiment.

FIG. 6 is a flowchart illustrating a method 600 of using unclonable functions in an authentication mechanism, according to an embodiment. The method 600 begins at operation 602, where a verifier device transmits, to a user device, an indication of supported unclonable functions and a challenge value. In an embodiment, the indication of supported unclonable functions is included in a field of a message structure. In an embodiment, the challenge value is a random value.

At 604, the indication of supported unclonable functions, a selected unclonable function, and a result are received from the user device. In the responsive transmission, the selected unclonable function selected from the supported unclonable functions, and the result is derived from an output of the selected unclonable function with the challenge value used as input to the selected unclonable function. In an embodiment, the selected unclonable function is a physically unclonable function (PUF). In another embodiment, the selected unclonable function is a software-based unclonable function.

At 606, an expected result of the selected unclonable function with the challenge value as input is obtained. This may be obtained from a database of challenge/response pairs that were previously tested and generated with the user device. Thus, in an embodiment, obtaining the expected result of the selected unclonable function with the challenge value as input includes accessing a secure storage device having challenge/response pairs for the supported unclonable functions for the user device and obtaining the expected result by performing a lookup on the challenge/response pairs using the challenge value and the selected unclonable function.

At 608, the user device is authenticated based on a comparison between the expected result and the result received from the user device.

Example System Components

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 7:
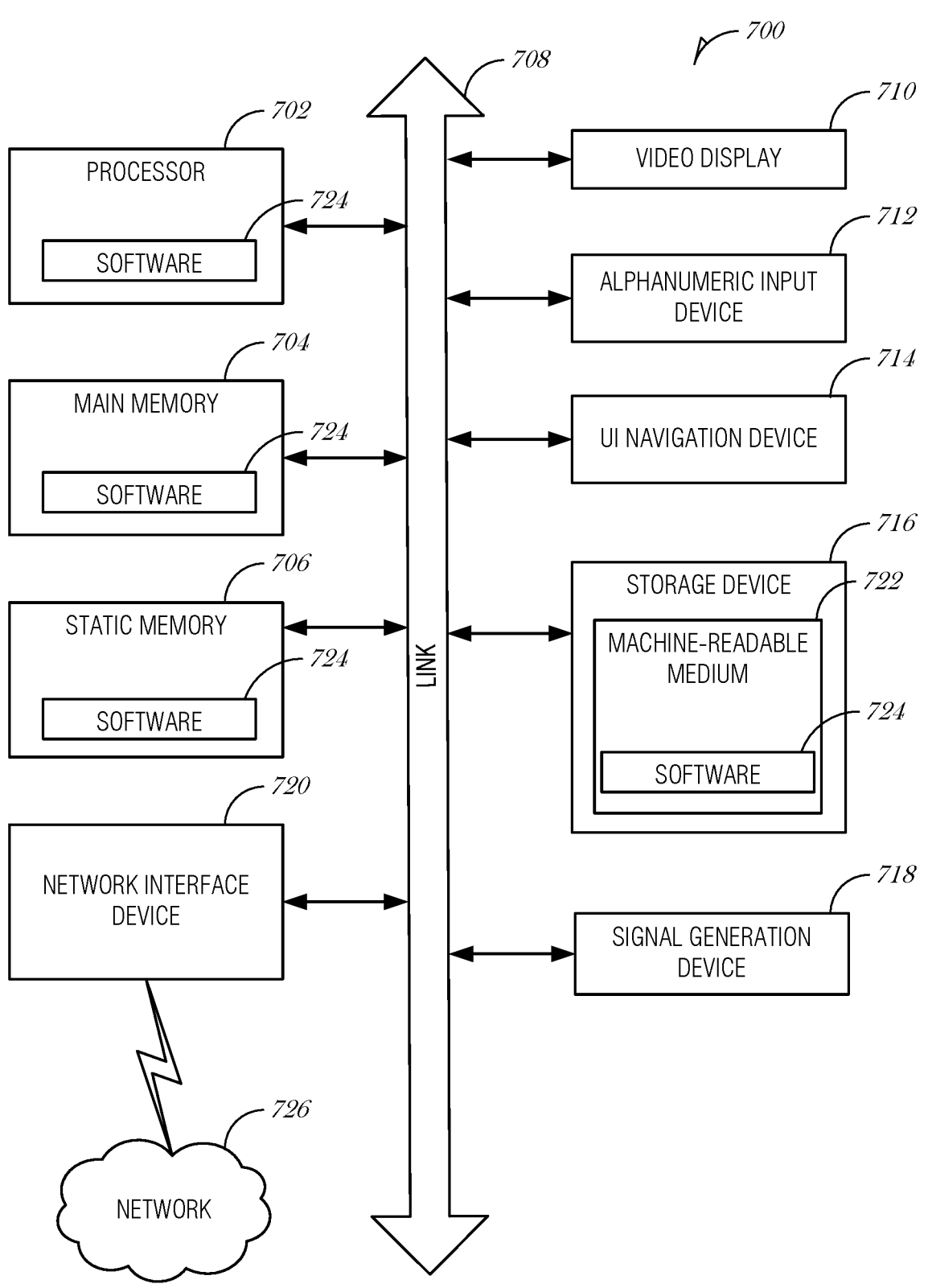
FIG. 7 is a block diagram illustrating an example machine upon which any one or more of the techniques (e.g., methodologies) discussed herein may perform, according to an embodiment.

FIG. 7 is a block diagram illustrating a machine in the example form of a computer system 700, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a smart identification card, a smart credential, an electronic credential, a verifier device, a user device, a mobile device, a personal computer (PC), a tablet PC, a hybrid tablet, a personal digital assistant (PDA), a mobile telephone, a kiosk, a beacon, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other type of sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a user device comprising: a memory device; and a processor subsystem, which when configured by instructions stored on the memory device, is operable to perform operations comprising: receiving, from a verifier device, an indication of supported unclonable functions and a challenge value; identifying an unclonable function from the supported unclonable functions, to obtain a selected unclonable function; executing the selected unclonable function based on the challenge value, to obtain a result; and transmitting the indication of supported unclonable functions, the selected unclonable function, and the result to the verifier device to authenticate the user device.

In Example 2, the subject matter of Example 1 includes, wherein the indication of supported unclonable functions is included in a field of a message structure.

In Example 3, the subject matter of Examples 1-2 includes, wherein the challenge value is a random value.

In Example 4, the subject matter of Examples 1-3 includes, wherein the selected unclonable function is a physically unclonable function (PUF).

In Example 5, the subject matter of Example 4 includes, wherein executing the unclonable function based on the challenge value comprises: executing the PUF with the challenge value as an input bit value for the PUF.

In Example 6, the subject matter of Examples 1-5 includes, wherein the selected unclonable function is a software-based unclonable function.

In Example 7, the subject matter of Example 6 includes, wherein executing the unclonable function based on the challenge value comprises: executing the software-based unclonable function with the challenge value as an input value to the software-based unclonable function.

In Example 8, the subject matter of Examples 1-7 includes, wherein the memory device is to store a credential.

In Example 9, the subject matter of Example 8 includes, wherein the unclonable function is used to secure the credential.

In Example 10, the subject matter of Example 9 includes, wherein the processor subsystem is operable to perform the operations comprising: receiving a message from the verifier device to access the credential, the message including the indication of supported unclonable functions and the challenge value, and the message having a corresponding response message format defined by a protocol; and transmitting the indication of supported unclonable functions, the selected unclonable function, and the result to the verifier device to authenticate the user device using the corresponding response message format.

Example 11 is a method for securing data on a user device, the method comprising: receiving, from a verifier device, an indication of supported unclonable functions and a challenge value; identifying an unclonable function from the supported unclonable functions, to obtain a selected unclonable function; executing the selected unclonable function based on the challenge value, to obtain a result; and transmitting the indication of supported unclonable functions, the selected unclonable function, and the result to the verifier device to authenticate the user device.

In Example 12, the subject matter of Example 11 includes, wherein the indication of supported unclonable functions is included in a field of a message structure.

In Example 13, the subject matter of Examples 11-12 includes, wherein the challenge value is a random value.

In Example 14, the subject matter of Examples 11-13 includes, wherein the selected unclonable function is a physically unclonable function (PUF).

In Example 15, the subject matter of Example 14 includes, wherein executing the unclonable function based on the challenge value comprises: executing the PUF with the challenge value as an input bit value for the PUF.

In Example 16, the subject matter of Examples 11-15 includes, wherein the selected unclonable function is a software-based unclonable function.

In Example 17, the subject matter of Example 16 includes, wherein executing the unclonable function based on the challenge value comprises: executing the software-based unclonable function with the challenge value as an input value to the software-based unclonable function.

In Example 18, the subject matter of Examples 11-17 includes, wherein the credential is stored in a memory device of the user device.

In Example 19, the subject matter of Example 18 includes, wherein the unclonable function is used to secure the credential.

In Example 20, the subject matter of Example 19 includes, receiving a message from the verifier device to access the credential, the message including the indication of supported unclonable functions and the challenge value, and the message having a corresponding response message format defined by a protocol; and transmitting the indication of supported unclonable functions, the selected unclonable function, and the result to the verifier device to authenticate the user device using the corresponding response message format.

Example 21 is a machine-readable medium including instructions for securing data on a user device, which when executed by the user device, cause the user device to perform operations comprising: receiving, from a verifier device, an indication of supported unclonable functions and a challenge value; identifying an unclonable function from the supported unclonable functions, to obtain a selected unclonable function; executing the selected unclonable function based on the challenge value, to obtain a result; and transmitting the indication of supported unclonable functions, the selected unclonable function, and the result to the verifier device to authenticate the user device.

In Example 22, the subject matter of Example 21 includes, wherein the indication of supported unclonable functions is included in a field of a message structure.

In Example 23, the subject matter of Examples 21-22 includes, wherein the challenge value is a random value.

In Example 24, the subject matter of Examples 21-23 includes, wherein the selected unclonable function is a physically unclonable function (PUF).

In Example 25, the subject matter of Example 24 includes, wherein executing the unclonable function based on the challenge value comprises: executing the PUF with the challenge value as an input bit value for the PUF.

In Example 26, the subject matter of Examples 21-25 includes, wherein the selected unclonable function is a software-based unclonable function.

In Example 27, the subject matter of Example 26 includes, wherein executing the unclonable function based on the challenge value comprises: executing the software-based unclonable function with the challenge value as an input value to the software-based unclonable function.

In Example 28, the subject matter of Examples 21-27 includes, wherein the memory device is to store a credential.

In Example 29, the subject matter of Example 28 includes, wherein the unclonable function is used to secure the credential.

In Example 30, the subject matter of Example 29 includes, wherein the processor subsystem is operable to perform the operations comprising: receiving a message from the verifier device to access the credential, the message including the indication of supported unclonable functions and the challenge value, and the message having a corresponding response message format defined by a protocol; and transmitting the indication of supported unclonable functions, the selected unclonable function, and the result to the verifier device to authenticate the user device using the corresponding response message format.

Example 31 is a verifier device comprising: a memory device; and a processor subsystem, which when configured by instructions stored on the memory device, is operable to perform the operations comprising: transmitting, to a user device, an indication of supported unclonable functions and a challenge value; receiving, from the user device, the indication of supported unclonable functions, a selected unclonable function, and a result, the selected unclonable function selected from the supported unclonable functions, and the result being derived from an output of the selected unclonable function with the challenge value used as input to the selected unclonable function; obtaining an expected result of the selected unclonable function with the challenge value as input; and authenticating the user device based on a comparison between the expected result and the result received from the user device.

In Example 32, the subject matter of Example 31 includes, wherein the indication of supported unclonable functions is included in a field of a message structure.

In Example 33, the subject matter of Examples 31-32 includes, wherein the challenge value is a random value.

In Example 34, the subject matter of Examples 31-33 includes, wherein the selected unclonable function is a physically unclonable function (PUF).

In Example 35, the subject matter of Examples 31-34 includes, wherein the selected unclonable function is a software-based unclonable function.

In Example 36, the subject matter of Examples 31-35 includes, wherein obtaining the expected result of the selected unclonable function with the challenge value as input comprises: accessing a secure storage device having challenge/response pairs for the supported unclonable functions for the user device; and obtaining the expected result by performing a lookup on the challenge/response pairs using the challenge value and the selected unclonable function.

Example 37 is a method of authenticating a user device at a verifier device, the method comprising: transmitting, to the user device, an indication of supported unclonable functions and a challenge value; receiving, from the user device, the indication of supported unclonable functions, a selected unclonable function, and a result, the selected unclonable function selected from the supported unclonable functions, and the result being derived from an output of the selected unclonable function with the challenge value used as input to the selected unclonable function; obtaining an expected result of the selected unclonable function with the challenge value as input; and authenticating the user device based on a comparison between the expected result and the result received from the user device.

In Example 38, the subject matter of Example 37 includes, wherein the indication of supported unclonable functions is included in a field of a message structure.

In Example 39, the subject matter of Examples 37-38 includes, wherein the challenge value is a random value.

In Example 40, the subject matter of Examples 37-39 includes, wherein the selected unclonable function is a physically unclonable function (PUF).

In Example 41, the subject matter of Examples 37-40 includes, wherein the selected unclonable function is a software-based unclonable function.

In Example 42, the subject matter of Examples 37-41 includes, wherein obtaining the expected result of the selected unclonable function with the challenge value as input comprises: accessing a secure storage device having challenge/response pairs for the supported unclonable functions for the user device; and obtaining the expected result by performing a lookup on the challenge/response pairs using the challenge value and the selected unclonable function.

Example 43 is a machine-readable medium including instructions for authenticating a user device at a verifier device, which when executed by the verifier device, cause the verifier device to perform operations comprising: transmitting, to the user device, an indication of supported unclonable functions and a challenge value; receiving, from the user device, the indication of supported unclonable functions, a selected unclonable function, and a result, the selected unclonable function selected from the supported unclonable functions, and the result being derived from an output of the selected unclonable function with the challenge value used as input to the selected unclonable function; obtaining an expected result of the selected unclonable function with the challenge value as input; and authenticating the user device based on a comparison between the expected result and the result received from the user device.

In Example 44, the subject matter of Example 43 includes, wherein the indication of supported unclonable functions is included in a field of a message structure.

In Example 45, the subject matter of Examples 43-44 includes, wherein the challenge value is a random value.

In Example 46, the subject matter of Examples 43-45 includes, wherein the selected unclonable function is a physically unclonable function (PUF).

In Example 47, the subject matter of Examples 43-46 includes, wherein the selected unclonable function is a software-based unclonable function.

In Example 48, the subject matter of Examples 43-47 includes, wherein obtaining the expected result of the selected unclonable function with the challenge value as input comprises: accessing a secure storage device having challenge/response pairs for the supported unclonable functions for the user device; and obtaining the expected result by performing a lookup on the challenge/response pairs using the challenge value and the selected unclonable function.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A machine-readable medium including instructions for securing data on a user device having a manufactured physically unclonable function (PUF) provided to the user device in the form of a credential or identity card by an issuer, which when executed by the user device during a transaction when a user with the user device is asked to present the user device to a verifier device, cause the user device to perform operations comprising:

receiving, from the verifier device, a challenge message including a list of identifiers of supported unclonable functions and a challenge value, wherein the verifier device selects a challenge from known challenge/response pairs and transmits it to the user device as part of the challenge message, wherein the known challenge/response pairs are stored in a secure storage;

identifying an unclonable function from the list of identifiers of supported unclonable functions, to obtain an identifier of a selected unclonable function and selecting, by the user device the identifier of the selected unclonable function to provide an indication to the verifier device of which unclonable function will be used;

executing the selected unclonable function based on the challenge value, to obtain a result; and transmitting, a reply message in response to the challenge message, the reply message including the list of identifiers of supported unclonable functions, the identifier of the selected unclonable function, and the result to the verifier device to authenticate the user device, wherein the verifier device is then able to check and ensure that the response is correct by comparing the result of the challenge/response pair corresponding with the challenge sent in the challenge message with that provided by the user device to authenticate the credential or the identity card.

2. The machine-readable medium of claim 1, wherein the list of identifiers of supported unclonable functions is included in a field of a message structure.

3. The machine-readable medium of claim 1, wherein the challenge value is a random value.

4. The machine-readable medium of claim 1, wherein the selected unclonable function is a physically unclonable function (PUF).

5. The machine-readable medium of claim 4, wherein executing the unclonable function based on the challenge value comprises:

executing the PUF with the challenge value as an input bit value for the PUF.

6. The machine-readable medium of claim 1, wherein the selected unclonable function is a software-based unclonable function.

7. The machine-readable medium of claim 6, wherein executing the unclonable function based on the challenge value comprises:

executing the software-based unclonable function with the challenge value as an input value to the software-based unclonable function.

8. The machine-readable medium of claim 1, wherein a credential is stored in a memory device of the user device and the selected unclonable function is used to secure the credential.

9. The machine-readable medium of claim 8, wherein the instructions cause the user device to perform operations comprising:

receiving the challenge message from the verifier device to access the credential, the challenge message including the list of identifiers of supported unclonable functions and the challenge value, and the challenge message having a corresponding response message format defined by a protocol; and transmitting the list of identifiers of supported unclonable functions, the identifier of the selected unclonable function, and the result to the verifier device to authenticate the user device using the corresponding response message format.

10. A verifier device comprising:

a memory device; and a processor subsystem, which when configured by instructions stored on the memory device, is operable to perform the operations comprising:

transmitting, to a user device during a transaction when a user with the user device is asked to present the user device to the verifier device, a message including a list of identifiers of supported unclonable functions and a challenge value, the user device having a manufactured physically unclonable function (PUF) provided to the user device in the form of a credential or identity card by an issuer, wherein the verifier device selects a challenge from known challenge/response pairs and transmits it to the user device as part of the message, wherein the known challenge/response pairs are stored in a secure storage of the verifier device;

receiving, from the user device, a response message including the list of identifiers of supported unclonable functions, an identifier of a selected unclonable function, and a result, the identifier of the selected unclonable function selected from the list of identifiers of supported unclonable functions and the identifier of the selected unclonable function is selected by the user device to provide an indication to the verifier device of which unclonable function will be used, and the result being derived from an output of the selected unclonable function with the challenge value used as input to the selected unclonable function, wherein the verifier device is then able to check and ensure that the response is correct by comparing the result of the challenge/response pair corresponding with the challenge sent in the message with the result provided by the user device to authenticate the credential or the identity card;

obtaining an expected result of the selected unclonable function with the challenge value as input; and authenticating the user device based on a comparison between the expected result and the result received from the user device.

11. The verifier device of claim 10, wherein the challenge value is a random value.

12. The verifier device of claim 10, wherein the selected unclonable function is a physically unclonable function (PUF).

13. The verifier device of claim 10, wherein the selected unclonable function is a software-based unclonable function.

14. The verifier device of claim 10, wherein obtaining the expected result of the selected unclonable function with the challenge value as input comprises:

accessing a secure storage device having challenge/response pairs for the supported unclonable functions for the user device; and obtaining the expected result by performing a lookup on the challenge/response pairs using the challenge value and the selected unclonable function.

15. A machine-readable medium including instructions for authenticating a user device at a verifier device, which when executed by the verifier device, cause the verifier device to perform operations comprising:

transmitting, to the user device during a transaction when a user with the user device is asked to present the user device to the verifier device, a message including a list of identifiers of supported unclonable functions and a challenge value, the user device having a manufactured physically unclonable function (PUF) provided to the user device in the form of a credential or identity card by an issuer, wherein the verifier device selects a challenge from known challenge/response pairs and transmits it to the user device as part of the message, wherein the known challenge/response pairs are stored in a secure storage of the verifier device;

receiving, from the user device, a response message including the list of identifiers of supported unclonable functions, an identifier of a selected unclonable function, and a result, the identifier of the selected unclonable function selected from the list of identifiers of supported unclonable functions and the identifier of the selected unclonable function is selected by the user device to provide an indication to the verifier device of which unclonable function will be used, and the result being derived from an output of the selected unclonable function with the challenge value used as input to the selected unclonable function, wherein the verifier device is then able to check and ensure that the response is correct by comparing the result of the challenge/response pair corresponding with the challenge sent in the message with the result provided by the user device to authenticate the credential or the identity card;

obtaining an expected result of the selected unclonable function with the challenge value as input; and authenticating the user device based on a comparison between the expected result and the result received from the user device.

16. The machine-readable medium of claim 15, wherein the list of identifiers of supported unclonable functions is included in a field of a message structure.

17. The machine-readable medium of claim 15, wherein the challenge value is a random value.

18. The machine-readable medium of claim 15, wherein the selected unclonable function is a physically unclonable function (PUF).

19. The machine-readable medium of claim 15, wherein the selected unclonable function is a software-based unclonable function.

20. The machine-readable medium of claim 15, wherein obtaining the expected result of the selected unclonable function with the challenge value as input comprises:

accessing a secure storage device having challenge/response pairs for the supported unclonable functions for the user device; and obtaining the expected result by performing a lookup on the challenge/response pairs using the challenge value and the selected unclonable function.

* * * * *